United States Patent
Wang et al.

(10) Patent No.: US 11,682,110 B2
(45) Date of Patent: Jun. 20, 2023

(54) MODULARIZED ADAPTIVE PROCESSING NEURAL NETWORK (MAP-NN) FOR LOW-DOSE CT

(71) Applicants: Ge Wang, Loudonville, NY (US); Hongming Shan, Troy, NY (US)

(72) Inventors: Ge Wang, Loudonville, NY (US); Hongming Shan, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 304 days.

(21) Appl. No.: 17/034,016

(22) Filed: Sep. 28, 2020

(65) Prior Publication Data

US 2021/0097662 A1    Apr. 1, 2021

Related U.S. Application Data

(60) Provisional application No. 62/906,993, filed on Sep. 27, 2019.

(51) Int. Cl.
| | |
|---|---|
| G06T 5/50 | (2006.01) |
| G06T 5/00 | (2006.01) |
| G06N 3/04 | (2023.01) |
| G06N 3/08 | (2023.01) |

(52) U.S. Cl.
CPC ............... *G06T 5/50* (2013.01); *G06N 3/04* (2013.01); *G06N 3/08* (2013.01); *G06T 5/002* (2013.01); *G06T 2207/10081* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | | |
|---|---|---|---|---|
| 2017/0372193 | A1* | 12/2017 | Mailhe | G06T 5/001 |
| 2019/0378270 | A1* | 12/2019 | Ida | G01R 33/5608 |
| 2021/0374907 | A1* | 12/2021 | Su | G06T 3/4053 |

FOREIGN PATENT DOCUMENTS

| | | | | | |
|---|---|---|---|---|---|
| CN | 107977966 | A | * | 5/2018 | |
| CN | 108022242 | A | * | 5/2018 | G06N 3/04 |
| CN | 113260852 | A | * | 8/2021 | G06T 5/002 |
| WO | WO-2020146437 | A1 | * | 7/2020 | G06T 5/002 |

\* cited by examiner

*Primary Examiner* — Jiangeng Sun
(74) *Attorney, Agent, or Firm* — Murtha Cullina LLP; Anthony P. Gangemi

(57) ABSTRACT

A system for enhancing a low-dose (LD) computed tomography (CT) image is described. The system includes a modularized adaptive processing neural network (MAP-NN) apparatus and a MAP module. The MAP-NN apparatus is configured to receive a LDCT image as input. The MAP-NN apparatus includes a number, T, trained neural network (NN) modules coupled in series. Each trained NN module is configured to generate a respective test intermediate output image based, at least in part, on a respective received test input image. Each test intermediate output image corresponds to an incrementally denoised respective received test input image. The MAP module is configured to identify an optimum mapping depth, D, based, at least in part, on a selected test intermediate output image, the selected test intermediate output image selected by a domain expert. The mapping depth, D, is less than or equal to the number, T.

17 Claims, 4 Drawing Sheets

MODULARIZED ADAPTIVE PROCESSING NEURAL NETWORK (MAP-NN) FOR LOW-DOSE CT

CROSS REFERENCE TO RELATED APPLICATION(S)

This application claims the benefit of U.S. Provisional Application No. 62/906,993, filed Sep. 27, 2019, which is incorporated by reference as if disclosed herein in its entirety.

GOVERNMENT LICENSE RIGHTS

This invention was made with government support under award number U01EB017140, awarded by the National Institutes of Health (NIH)/National Institute of Biomedical Imaging and Bioengineering (NIBIB). The government has certain rights in the invention.

FIELD

The present disclosure relates to low-dose CT (computed tomography), in particular, to a modularized adaptive processing neural network (MAP-NN) for low-dose CT.

BACKGROUND

Computed tomography (CT) is a widely used imaging modality with applications in biology, medicine, airport security, clinical, industrial, and other areas. As is known, CT utilizes x-ray radiation to create internal images of, for example, internal organs of a patient. There is concern that repeated exposure to x-ray radiation from CT scans may lead to an elevated risk of cancer and other disorders. One possible solution is to reduce the radiation dosage for a given x-ray radiation exposure. Although a reduced radiation dosage reduces the exposure of an individual to x-ray radiation, images reconstructed from the reduced radiation may be noisy and/or may contain artifacts. The noise and the artifacts may adversely affect diagnostic performance and subsequent treatment.

SUMMARY

In an embodiment, there is provided a system for enhancing a low-dose (LD) computed tomography (CT) image. The system includes a modularized adaptive processing neural network (MAP-NN) apparatus and a MAP module. The MAP-NN apparatus is configured to receive a LDCT image as input. The MAP-NN apparatus includes a number, T, trained neural network (NN) modules coupled in series. Each trained NN module is configured to generate a respective test intermediate output image based, at least in part, on a respective received test input image. Each test intermediate output image corresponds to an incrementally denoised respective received test input image. The MAP module is configured to identify an optimum mapping depth, D, based, at least in part, on a selected test intermediate output image, the selected test intermediate output image selected by a domain expert. The mapping depth, D, is less than or equal to the number, T.

In some embodiments of the system, the trained NN modules are trained based, at least in part, on a training input image. The training input image corresponds to a training radiation dose level.

In some embodiments of the system, the training radiation dose level is different from a testing radiation dose level.

In some embodiments of the system, each NN module is the same as each other NN module.

In some embodiments of the system, each NN module is selected from the group including a fully connected convolutional network, a conveying-link oriented network encoder-decoder ("CLONE"), a convolutional encoder-decoder network with skip connections, a convolutional encoder-decoder with conveying-paths, a conveying-path-based convolutional encoder-decoder ("CPCE"), a stacked denoising autoencoder, and a corresponding three dimensional (3D) variant of each network.

In some embodiments of the system, the MAP module is further configured to determine a weighted sum of the T respective test intermediate images.

In some embodiments of the system, the trained NN modules are trained adversarially based, at least in part, on an objective function.

In some embodiments of the system, the objective function is a composite function that includes a plurality of component functions.

In an embodiment, there is provided a method for enhancing a low-dose (LD) computed tomography (CT) image. The method includes receiving, by a modularized adaptive processing neural network (MAP-NN) apparatus, a LDCT image as input. The MAP-NN apparatus includes a number, T, trained neural network (NN) modules coupled in series. The method further includes generating, by each trained NN module, a respective test intermediate output image based, at least in part, on a respective received test input image. Each test intermediate output image corresponds to an incrementally denoised respective received test input image. The method further includes identifying, by a MAP module, an optimum mapping depth, D, based, at least in part, on a selected test intermediate output image. The selected test intermediate output image is selected by a domain expert. The mapping depth, D, is less than or equal to the number, T.

In some embodiments of the method, the trained NN modules are trained based, at least in part, on a training input image. The training input image corresponds to a training radiation dose level.

In some embodiments of the method, the training radiation dose level is different from a testing radiation dose level.

In some embodiments of the method, each NN module is the same as each other NN module.

In some embodiments of the method, each NN module is selected from the group including a fully connected convolutional network, a conveying-link oriented network encoder-decoder ("CLONE"), a convolutional encoder-decoder network with skip connections, a convolutional encoder-decoder with conveying-paths, a conveying-path-based convolutional encoder-decoder ("CPCE"), a stacked denoising autoencoder, and a corresponding three dimensional (3D) variant of each network.

In some embodiments, the method further includes determining, by the MAP module, a weighted sum of the T respective test intermediate images.

In some embodiments of the method, the trained NN modules are trained adversarially based, at least in part, on an objective function.

In some embodiments of the method, the objective function is a composite function that includes a plurality of component functions.

In an embodiment, there is provided a computer readable storage device. The device has stored thereon instructions configured for enhancing a low-dose (LD) computed tomography (CT) image. The instructions that when executed by one or more processors result in the following operations including: receiving, by a modularized adaptive processing neural network (MAP-NN) apparatus, a LDCT image as input. The MAP-NN apparatus includes a number, T, trained neural network (NN) modules coupled in series. The operations further include generating, by each trained NN module, a respective test intermediate output image based, at least in part, on a respective received test input image. Each test intermediate output image corresponds to an incrementally denoised respective received test input image. The operations further include identifying an optimum mapping depth, D, based, at least in part, on a selected test intermediate output image. The selected test intermediate output image is selected by a domain expert. The mapping depth, D, is less than or equal to the number, T.

In some embodiments of the device, the trained NN modules are trained based, at least in part, on a training input image. The training input image corresponds to a training radiation dose level.

In some embodiments of the device, the training radiation dose level is different from a testing radiation dose level.

In some embodiments of the device, the operations further include determining a weighted sum of the T respective test intermediate images.

BRIEF DESCRIPTION OF THE DRAWINGS

The drawings show embodiments of the disclosed subject matter for the purpose of illustrating features and advantages of the disclosed subject matter. However, it should be understood that the present application is not limited to the precise arrangements and instrumentalities shown in the drawings, wherein.

DETAILED DESCRIPTION

Figure 1:
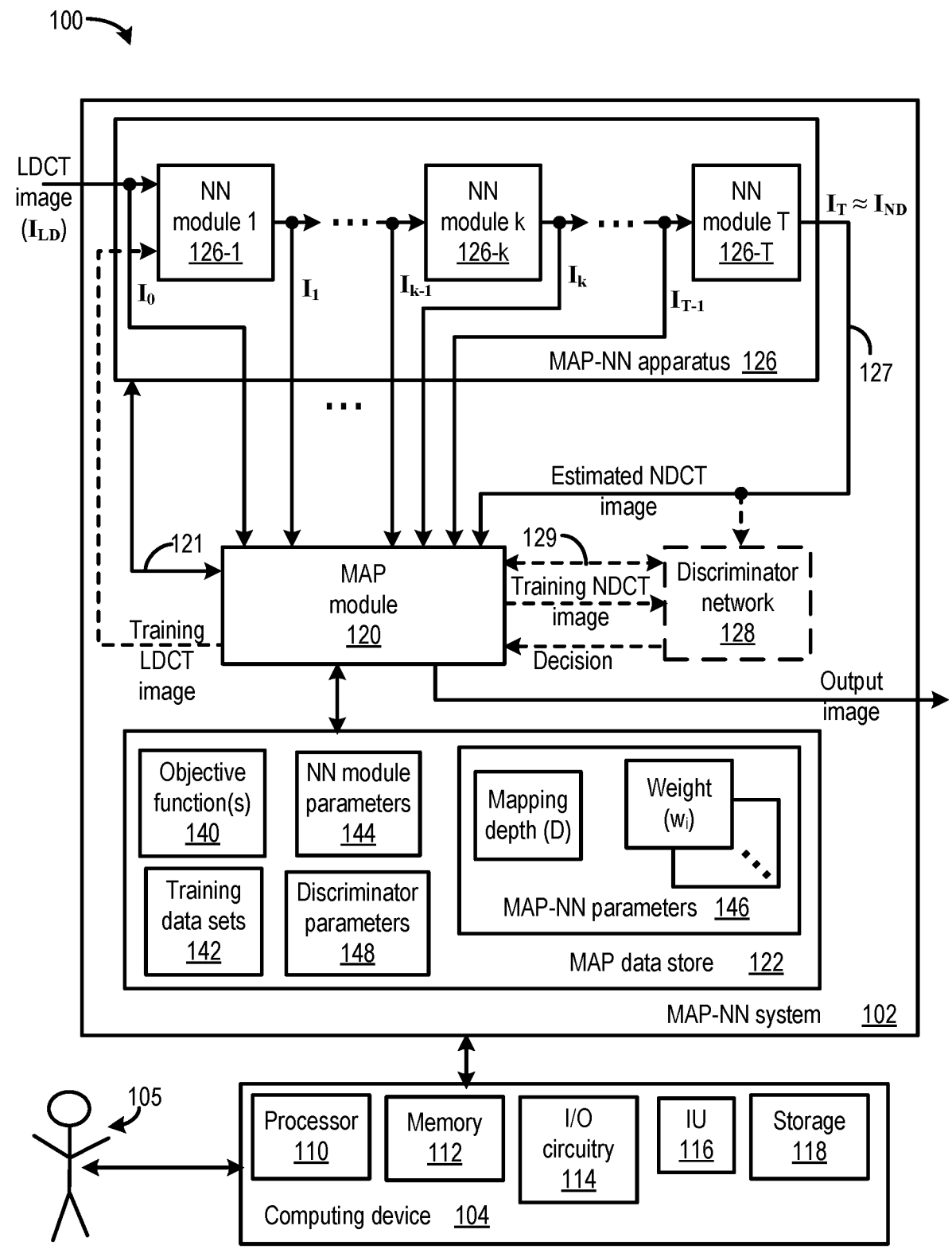
FIG. 1 illustrates a functional block diagram of a system that includes a modularized adaptive processing neural network (MAP-NN) system for low-dose CT (LDCT) consistent with several embodiments of the present disclosure.

Image post-processing techniques for low-dose CT (LDCT) images may be configured to at least mitigate noise and/or artifacts that are a result of low-dose CT. In one nonlimiting example, a convolutional neural network (CNN) may be utilized for low dose CT image post-processing. Generally, denoising models may be trained to relate a specific low-dose level to a particular normal dose level. However, the trained model may not generalize well to low dose images acquired for a different dose level. A practical solution is to re-train the network using a new training dataset that is associated with the intended low dose level(s). To deal with different radiation levels, a relatively larger number of different denoising models may be trained, one for each distinct radiation dose level. Training a plurality of models can be cumbersome and time-consuming.

Generally, the present disclosure relates to a modularized adaptive processing neural network (MAP-NN) for low-dose CT. A system, method and/or apparatus, consistent with the present disclosure are configured to enhance a low-dose (LD) computed tomography (CT) image. A MAP-NN system may include a MAP-NN apparatus that includes at least one neural network (NN) module. In some embodiments, each NN module of a plurality of NN modules may be the same as each other NN module in the plurality of NN modules. In some embodiments, at least one NN module of a plurality of NN modules may not be the same as each other NN module in the plurality of NN modules. A plurality of NN modules may be cascaded, i.e., coupled in series. The MAP-NN system may include a MAP module. The MAP-NN system may further include a discriminator network that is utilized during training. The MAP-NN apparatus and discriminator network may be trained, adversarially, based, at least in part, on one or more training low-dose CT images corresponding to a training radiation dosage and based, at least in part, on corresponding normal dose (ND) CT image(s). Training may include determining an optimum number of NN modules to be included in the MAP-NN apparatus.

The trained MAP-NN apparatus may then be configured to receive a test LDCT image and to provide an output image. The radiation dosage associated with the test LDCT image may differ from the training dosage. Each NN module in the trained MAP-NN apparatus may be configured to provide a respective intermediate output image. Each intermediate output image may then correspond to a respective incrementally denoised image with the incremental denoising relative to an immediately prior NN module in the sequence. An output image may then correspond to a selected intermediate output image. The selection may be based, at least in part, on input from a domain expert (e.g., a radiologist). An index of the NN module associated with the selected intermediate output image may then correspond to imaging depth. The index may correspond to a respective position of the selected NN module in the cascade, i.e., sequence, of NN modules.

Thus, a method, system and/or apparatus consistent with the present disclosure may be configured to accommodate a "radiologist-in-the-loop". Providing intermediate output images, as described herein, is configured to allow the domain expert (e.g., radiologist) to select the output image that best shows a region of interest. In other words, incremental denoising is configured to provide a plurality of intermediate output images. A first intermediate output image may show a first region of interest relatively better than a second intermediated output image. The second intermediate output image may show a second region of interest relatively better than the first intermediate output image. Providing the plurality of intermediate output images allows the radiologist to select the best image for the particular region of interest, providing a sort of human-machine hybrid.

FIG. 1 illustrates a functional block diagram of a system 100 that includes a MAP-NN system 102, consistent with several embodiments of the present disclosure. MAP-NN system 102 is configured to enhance a low-dose (LD) computed tomography (CT) image based, at least in part, on an LDCT image. MAP-NN system 102 includes a MAP module 120, a MAP data store 122, and a MAP-NN apparatus 126. MAP-NN system 102 may include a discriminator network 128 during training, as will be described in more detail below.

MAP data store 122 is configured to store training data and/or system configuration data including, but not limited to, one or more objective functions 140, one or more training data sets 142, NN module parameters 144, MAP-NN parameters 146 and discriminator parameters 148. MAP-NN parameters may include, for example, mapping depth, D, and/or one or more weights, $w_i$, as will be described in more detail below.

System 100 further includes a computing device 104. Computing device 104 is configured to perform the operations of MAP-NN system 102. The computing device 104 may include, but is not limited to, a server, a workstation computer, a desktop computer, a laptop computer, a tablet computer, an ultraportable computer, an ultramobile computer, a netbook computer and/or a subnotebook computer, etc. Computing device 104 includes a processor 110, a memory 112, input/output (I/O) circuitry 114, a user interface (UI) 116, and storage 118.

Processor 110 may include one or more processing units and is configured to perform operations of MAP-NN system 102, e.g., MAP module 120, MAP-NN apparatus 126, and/or discriminator network 128. Memory 112 may be configured to store data associated with MAP-NN system 102, e.g., MAP data store 122. I/O circuitry 114 may be configured to communicate wired and/or wirelessly. UI 116 may include a user input device (e.g., keyboard, mouse, microphone, touch sensitive display, etc.) and/or a user output device, e.g., a display, a speaker, etc. A user 105 (e.g., a radiologist, a domain expert, an imaging expert) may utilize UI 116 for providing information to MAP-NN system 102 and receiving output from system 102. Storage 118 may be configured to store at least a portion of MAP data store 122.

MAP-NN apparatus 126 includes at least one neural network (NN) module 126-1, . . . , 126-$k$, . . . , 126-T. For a MAP-NN apparatus 126 that includes a plurality of NN modules, the NN modules may be cascaded, i.e., coupled in series. In some embodiments, the NN modules 126-1, . . . , 126-$k$, . . . , 126-T may be identical. A MAP-NN apparatus 126 that includes a plurality of identical modules may be configured to facilitate training by constraining adjustable parameters. In some embodiments, at least some of the NN modules 126-1, . . . , 126-$k$, . . . , 126-T may not be identical. A MAP-NN apparatus 126 that includes at least one nonidentical module may be configured to facilitate optimizing individual modules for particular aspects of incremental denoising.

Generally, each NN module 126-1, . . . , 126-$k$, . . . , 126-T may correspond to a convolutional neural network (CNN). The NN module(s) 126-1, . . . , 126-$k$, . . . , 126-T may include, but are not limited to, a fully connected convolutional network, a conveying-link oriented network encoder-decoder ("CLONE"), a convolutional encoder-decoder network with skip connections, a convolutional encoder-decoder with conveying-paths, a conveying-path-based convolutional encoder-decoder ("CPCE"), a stacked denoising autoencoder, a corresponding three dimensional (3D) variant of each network, etc.

Figure 2A:
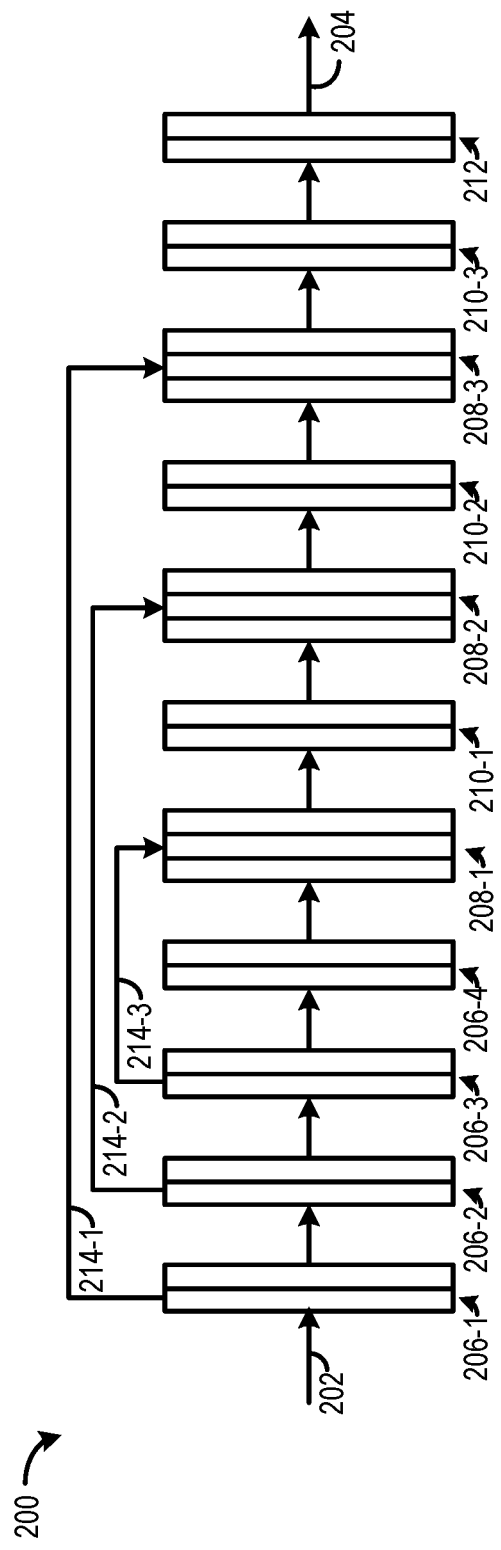
FIGS. 2A and 2B illustrate functional block diagrams of two example NN modules consistent with several embodiments of the present disclosure.
Figure 2B:
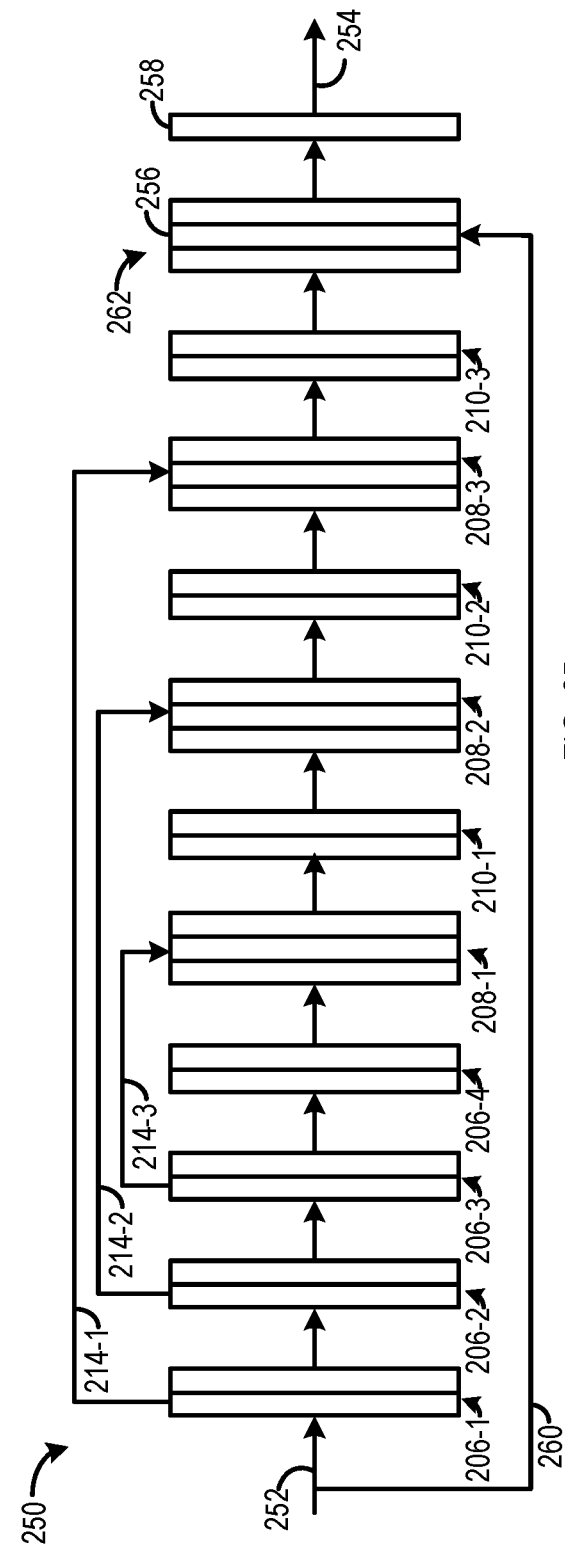

Turning now to FIGS. 2A and 2B, FIGS. 2A and 2B illustrate functional block diagrams two example NN modules 200, 250 consistent with several embodiments of the present disclosure. Example NN modules 200 and 250 are two nonlimiting examples of NN modules 126-1, . . . , 126-T of FIG. 1. In the FIGS. 2A and 2B, like elements have like reference designators. A first example NN module 200 corresponds to a conveying-path-based convolutional encoder-decoder (CPCE) and a second example NN module 250 corresponds to a conveying-link-oriented network encoder-decoder (CLONE). Thus, NN module 250 may be understood as including NN module 200 and further including a summing stage, an output clipping stage and a skip connection, as will be described in more detail below.

Turning first to FIG. 2A, NN module 200 includes four convolutional stages 206-1, . . . , 206-4 of a first convolutional stage type, three deconvolutional stages 208-1, 208-2, 208-3 of a first deconvolutional stage type, three convolutional stages 210-1, 210-2, 210-3 of a second type and a deconvolutional stage 212 of a second type. Each convolutional stage includes a convolutional layer followed by a rectified linear unit (ReLU). Similarly, each deconvolutional stage includes a deconvolutional layer followed by an ReLU. NN module 200 may thus include eleven stages between input and output. An order of the stages is 206-1, 206-2, 206-3, 206-4, 208-1, 210-1, 208-2, 210-2, 208-3, 210-3 and 212.

NN module 200 further includes three conveying paths 214-1, 214-2, 214-3. A first conveying path 214-1 is coupled between a first convolutional stage 206-1 and a third deconvolutional stage 208-3. A second conveying path 214-2 is coupled between a second convolutional stage 206-2 and a second deconvolutional stage 208-2. A third conveying path 214-3 is coupled between a third convolutional stage 206-3 and a first deconvolutional stage 208-2. Each of the deconvolutional stages 208-1, 208-2, 208-3 further includes concatenation layer between the deconvolutional layer and the ReLU configured to receive an output of a respective conveying path.

In one nonlimiting example, each first convolutional stage type includes a convolutional layer having 32 filters of kernel size 3×3 with a stride of 1 (i.e., n32k3s1). In one nonlimiting example, each first deconvolutional stage type includes a deconvolutional layer having 32 filters of kernel size 3×3 with a stride of 1 (i.e., n32k3s1). In one nonlimiting example, each second convolutional stage type includes a convolutional layer having 32 filters of kernel size 1×1 with a stride of 1 (i.e., n32k1s1). In one nonlimiting example, the second deconvolutional stage type includes a deconvolutional layer having 1 filter of kernel size 3×3 with a stride of 1 (i.e., n1k3s1).

Example NN module 200 is configured to receive an input image 202 and provide an output image 204 corresponding to processed input image. The output image may thus correspond to incrementally denoised input image. A cascade of a plurality of example NN modules 200 may thus be configured to progressively denoise input image, e.g., LDCT image.

Turning now to FIG. 2B, NN module 250 includes the elements of NN module 200 configured as described herein. NN module 250 includes a deconvolutional stage 262 of the second type in place of deconvolutional stage 212. The deconvolutional stage 262 further includes a summation layer between the deconvolutional layer and the ReLU. NN module 250 includes an output clipping stage 258 coupled to the deconvolutional stage 262. NN module 250 further includes a skip connection 260 coupling an input 252 to the deconvolutional stage 262.

Example NN module 250 is configured to receive an input image 252 and provide an output image 254 corresponding to a processed input image. The output image may thus correspond to incrementally denoised input image. A cascade of a plurality of example NN modules 250 may thus be configured to progressively denoise input image, e.g., LDCT image.

Thus, example NN module 250 generally corresponds to example NN module 200 with the addition of a skip connection and with the addition of output clipping. The conveying links in the example NN modules 200, 250 may provide compactness. Each conveying path is configured to copy an early feature map and reuse the copied feature map as an input to a later layer of the same feature-map size in a network. Copying a feature map to a later layer of the same size is configured to preserve details of the high-resolution features. Example NN modules 200, 250 thus each include three conveying paths 214-1, 214-2, 214-3, copying the output of an early convolutional layer and reusing it as the input to a later deconvolutional layer of the same feature-map size. To reduce the computational cost, one convolutional layer (included in convolutional stages 210-1, 210-2, 210-3 of the second type) with 32 filters of size 1×1 is used after each conveying path, reducing the number of feature maps from 64 to 32.

It may be appreciated that training a deep progressive denoising network that includes one or more NN modules can be challenging. Challenges include, but are not limited to exploding/vanishing gradients, storage capacity for storing an exact copy of information in many layers. In LDCT denoising, NDCT images may be quite similar to their LDCT counterparts, and processing modules may be configured to maintain an exact copy of input images for modules. The output clipping stage 258 and the residual skip connection 260 are configured to mitigate these challenges. The output clipping stage 258 is configured to clip the NN module output into a range of [0, 1], corresponding to a range of the input. The clipping is configured to reduce or prevent gradients from becoming extreme. The residual skip connection 260 from the input 252 to the output 254 of each NN module 250 is configured to avoid vanishing gradients. Thus, each NN module 250 may be configured to infer a noise distribution rather than a whole image, resulting in compression of the output space and avoiding the use of the exact copy of the input image.

Turning again to FIG. 1, in operation, MAP module 120 is configured to manage training operations of MAP-NN apparatus 126 (and discriminator network 128). MAP module 120 is further configured to manage operation of MAP-NN apparatus 126 after training and may be configured to provide an output image. During training, MAP module 120 is configured to retrieve a training data set from training data sets 142 stored in MAP data store 122. A training data set may include a training LDCT image and a corresponding training NDCT image. The training NDCT image may correspond to a "ground truth". In one nonlimiting example, the training LDCT image may include a simulated LDCT image and the training NDCT image may include a corresponding NDCT image. The training LDCT image may correspond to a particular radiation dosage, i.e., a training dosage. During training, the MAP-NN apparatus 126 is configured to receive the training LDCT image. The corresponding NDCT image may be provided to the discriminator network 128. The MAP-NN apparatus 126 (and discriminator network 128) may be trained adversarially as a generative adversarial network (GAN). For example, the MAP module 120 may be configured to adjust NN module parameters and discriminator parameters during training, as described herein.

MAP module 120 is configured to receive an input image $I_0$, and intermediate image(s) $I_1, \ldots, I_{k-1}, I_k, \ldots, I_{T-1}, I_T$. The subscript k may be understood as an index associated with a respective intermediate output image and the particular NN module that produced the $k^{th}$ intermediate image. The input image $I_0$ corresponds to an LDCT image that is input to a first NN module 126-1. The intermediate image $I_1$ corresponds to the output image of the first NN module 126-1. Similarly, the intermediate image $I_{k-1}$ corresponds to an output image from a $(k-1)^{th}$ NN module that is input to a $k^{th}$ NN module 126-k and intermediate image $I_k$ corresponds to an output image of the $k^{th}$ NN module 126-k. Similarly, intermediate image $I_{T-1}$ corresponds an output image from a $(T-1)^{th}$ NN module that is input to a $T^{th}$ NN module 126-T and intermediate image $I_T$ corresponds to an output image of the $T^{th}$ NN module 126-T. The intermediate image may correspond to progressively denoised image beginning with $I_1$ and ending with $I_T$.

Thus, MAP-NN apparatus 126 is configured to implement progressive denoising operations. Operation of MAP-NN apparatus 126 may be expressed algebraically as:

$$I_{den}=g^T(I_{LD})=(g\circ g\circ \ldots \circ)g(I_{LD})\approx I_{ND} \quad (1)$$

where T=#g (i.e., T is the number of NN modules), $I_{den}$, $I_{LD}$ and $I_{ND}$ denote a denoised image, an LDCT FBP (filtered back projection) image and an NDCT FBP image, respectively. The operator ∘ denotes a functional composition operation, g denotes an NN module (e.g., NN module 126-1), $g^t$ denotes the t-fold product of the NN module g. The number of NN modules for training is denoted by T. In some embodiments, the parameters of all the NN modules may be shared. In other words, for identical NN modules, one set of NN module parameters may be configured to apply to each NN module of MAP-NN apparatus 126. In one nonlimiting example, a trained the MAP-NN apparatus may include five NN modules, i.e., T=5. However, this disclosure is not limited in this regard. In some embodiments, the parameters of at least some of the NN modules may not be shared.

Each MAP-NN apparatus 126 is configured to include one or more NN modules, as described herein. A size of T, i.e., a maximum number of NN modules, may affect operation of MAP-NN apparatus 126. For example, a relatively larger T may correspond to an increased model capacity of MAP-NN. In another example, with a relatively larger T, each NN module may remove relatively less noise from its respective input image. Relatively more intermediate denoised images may then be available for the deliberation of radiologists and a difference between two consecutively denoised images (e.g., outputs from the $k^{th}$ and the $(k+1)^{th}$ NN modules) may be relatively smaller. Such reduction in differences between consecutive intermediate images may facilitate finer tuning of the resultant image quality.

During training, MAP module 120 may be configured to adjust NN module parameters 121 and to minimize an objective function 140. In an embodiment, the objective function may be a composite function that includes a plurality of component functions. In one nonlimiting example, the composite function for optimizing the MAP-NN apparatus 126 may include three components: adversarial loss, mean-squared error (MSE) and edge incoherence.

The adversarial loss corresponds to a generative component of a loss function for optimizing a generative adversarial network (GAN). The MAP-NN apparatus 126 corresponds to the generative component and the discriminator network 128 corresponds to the discriminator. During training, the GAN is configured to encourage the generator (MAP-NN apparatus 126) to produce samples indistinguishable from the NDCT images as judged by the discriminator network 128. MAP module 120 may be configured to adjust discriminator network parameters 129 during training. In one nonlimiting example, adversarial loss may be defined within a Wasserstein generative adversarial network (WGAN) framework with gradient penalty (WGAN-GP) as:

$$\min_{\theta_g} \mathcal{L}_a = -\mathbb{E}_{I_{LD}}[D(g^T(I_{LD}))] \quad (2)$$

The discriminator network 128 (indicated by D(•) in equation 2) aims to distinguish a generated image 127 (i.e., an estimated NDCT image) from a ground-truth sample (i.e., training NDCT image) and $\theta_g$ denotes the parameters (i.e., NN module parameters 144) in network g, i.e., each NN module. In one nonlimiting example, the generator $g^T$ may be iteratively optimized once and the discriminator D(•) may be iteratively optimized four times. In another nonlimiting example, the discriminator network 128 may include six convolutional layers with 64, 64, 128, 128, 256 and 256 filters of size 3×3, followed by two fully connected layers of sizes 1,024 and 1, respectively. Each convolutional layer is followed by a leaky ReLU. In one nonlimiting example, each leaky ReLU may have a negative slope of 0.2 when the unit is not active. A unit filter stride may be used for oddly indexed convolutional layers. The stride may be doubled for evenly numbered layers. However, this disclosure is not limited in this regard.

The MSE is configured to measure a difference between the output, i.e., estimated NDCT image 127 and an NDCT image, i.e., training NDCT image. The MSE is configured to reduce noise that may be present in the input LDCT image. Formally, the MSE may be defined as:

$$\min_{\theta_g} \mathcal{L}_m = \mathbb{E}_{(I_{LD},I_{ND})}\|I_{ND} - g^T(I_{LD})\|^2 \quad (3)$$

Edge incoherence is configured to measure a difference between Sobel filtrations of real and estimated images as:

$$\min_{\theta_g} \mathcal{L}_e = \mathbb{E}_{(I_{LD},I_{ND})}\|SF(I_{ND}) - SF(g^T(I_{LD}))\|^2 \quad (4)$$

where SF denotes a Sobel filtration corresponding to a gradient vector at each point in the image. The filtration is based on convolving the image with a small and separable filter. As a result, the gradient approximation it produces is relatively crude, in particular for high-frequency variations in the image, but may help to sense edge information in a denoised image.

The final objective function for optimizing MAP-NN may then be defined as:

$$\min_{\theta_g} \mathcal{L} = \mathcal{L}_a + \lambda_m \mathcal{L}_m + \lambda_e \mathcal{L}_e \quad (5)$$

which is configured to encourage the denoised image to maintain texture, reduce noise, and preserve edge coherence. The parameters of the discriminator network 128, $\theta_d$, may be updated by minimizing the loss function:

$$\min_{\theta_d} \mathbb{E}_{I_{LD}}[D(g^T(I_{LD}))] - \mathbb{E}_{I_{ND}}[D((I_{ND}))]\lambda_p \mathbb{E}_{\tilde{I}}[(\|\nabla_{\tilde{I}} D(\tilde{I})\|_2 - 1)^2] \quad (6)$$

where $\tilde{I}=\epsilon \cdot g^T(I_{LD})+(1-\epsilon) \cdot I_{ND}$ with c being a uniform random variable over the interval [0,1], $\nabla_{\tilde{I}}D(\tilde{I})$ denotes the gradient of D(•) with respect to variable $\tilde{I}$, and $\lambda_p$ is the trade-off parameter for the gradient penalty.

Thus, a MAP-NN apparatus, e.g., MAP-NN apparatus 126, may be configured to implement the operations described by equation (1). It may be appreciated that a MAP-NN apparatus reduces to a conventional denoising model if the MAP-NN apparatus contains only one NN module, i.e., T=1. In one embodiment, when T>1 and the NN modules are identical, the model complexity/mapping depth of the MAP-NN apparatus may be increased without adding new parameters. In other words, increasing the mapping depth corresponds to adding one or more NN module(s) with each added NN module identical to each other NN module, e.g., NN module 126-1. The increased complexity/depth may result in a corresponding increase the size of the receptive field.

In another embodiment, when T>1, at least some of the NN modules are not identical, and training is complete, the number T may be set, i.e., may be determined based, at least in part on the training. During testing, an optimum mapping depth, D, may be determined based, at least in part, on a selection by a domain expert, e.g., radiologist. The mapping depth, D, may generally be less than or equal to the number of NN modules, T. The intermediate output images from the NN modules may thus facilitate selection of an optimum configuration of NN modules, as described herein.

The MAP-NN apparatus is configured to provide a sequence of intermediate denoised images from each NN module, i.e., $\{g^i(I_{LD})\}_{i=1}^T$, indicated in FIG. 1 by $I_1, \ldots, I_{k-1}, I_k, \ldots, I_{T-1}, I_T$. The sequence of intermediate denoised images can be viewed as a dynamic denoising process, and is directly proportional to a computational elevation of radiation dose. Different from learning a direct mapping from LDCT to NDCT images, the learnt noise reduction direction encoded in each NN module does not require noise-free CT images as the labels/targets for the MAP-NN apparatus. For a new dose level, each trained NN module may be applied, obtaining a sequence of denoised images. A domain expert (e.g., a radiologist) may then select a best denoising result from the sequence of denoised images $I_1, \ldots, I_{k-1}, I_k, \ldots, I_{T-1}, I_T$. An index of the NN module that provided the selected result may then correspond to the mapping depth, D. With radiologists-in-the-loop, the denoised image quality can be optimized in a task-specific fashion even if an exact imaging and protocol is unknown.

The modularized adaptive processing neural network (MAP-NN) apparatus, method, and/or system correspond to a progressive denoising technique that includes a plurality of identical network units (i.e., NN modules 126-1, ..., 126-T). The MAP-NN apparatus and/or system is configured to produce a sequence of intermediate denoised images $I_1, \ldots, I_{k-1}, I_k, \ldots, I_{T-1}, I_T$, one from each NN module. The sequence of intermediate denoised images corresponds to an iterative noise reduction structure that may evolve to a normal-dose CT image and possibly beyond. The sequence of NN modules is configured to result in at least a partial noise removal from an image in an iterative fashion, i.e. a gradual improvement after an image has been passed through one NN module.

In another embodiment, MAP-NN system 102 and/or MAP module 120 may be configured to further process the input image $I_0$, and/or one or more of the intermediate images $I_1, \ldots, I_k, I_{k-1}, \ldots$, and/or $I_T$. Given a new CT image, $I_0$, that was acquired at a different radiation dose than the training radiation dose, the application of the MAP-NN structure yields a sequence of denoised images, $I_1, I_2, \ldots, I_T$, with T being the total number of NN modules. In this embodiment, MAP module 120 may be configured to determine a weighted sum of the input image and at least some of the intermediated images. The operations may be mathematically described as:

$$I_{opt} = \sum_{i=0}^{D} w_i I_i, \text{ s.t. } \sum_{i=0}^{D} w_i = 1 \text{ and } w_i \geq 0, i = 0, \ldots, D \quad (7)$$

where $w_i$ are the weights and D is the mapping depth, with $D \leq T$. The mapping depth, D, is configured to allow determining the weighted sum using all or fewer than all of the intermediate images. In other words, a best estimated image may be selected whether or not it includes contributions from all of the intermediate images.

Thus, instead of re-training MAP-NN system to determine NN module network parameters for each NN module in order to map images at a new low dose level to the training dose level, the number of NN modules (i.e., the mapping depth D) and the D unknown parameters, i.e., $\{w_i\}_{i=0}^{D}$ may be determined. It may be appreciated that the resultant denoised image $I_{opt}$ is perpendicular to the craniocaudal direction, suggesting that the technique may allow a slight mismatch between the low-dose and training-dose image pair as ground-truth in order to determine the D parameters in Eq. (7). In order to optimize the weights $\{w_i\}_{i=0}^{D}$, a perceptual loss (PL) as the loss function may be determined as:

$$\min_{\{w_i\}_{i=0}^{D}} \frac{1}{N} \sum_{k=1}^{N} \| \phi(I_{ND}^{(k)}) - \phi(I_{opt}^{(k)}) \|^2 \quad (8)$$

where ϕ is the output of a $16^{th}$ convolutional layer in a pre-trained VGG-19 network, and N is a number of image patches at the new low dose level.

Thus, a sequence of intermediate image outputs from a set of trained NN modules may be linearly combined to produce an output image (e.g., a denoised image) that is of acceptable quality for noisy image inputs that were scanned at different low dose levels. Instead of re-training or fine-tuning the model using new acquired data, an apparatus, method and/or system consistent with the present disclosure may utilize one (un)paired image to determine a relatively small set of weight parameters. It is contemplated that these weighting parameters may be extracted from any input low-dose CT image, since the low-dose level or noise index could be learned from images, and the weighting parameters are strongly correlated to the noise index. In other words, the weighting parameters for the customized linear combination may be estimated by another compact network for universal low dose CT denoising.

Thus, a MAP-NN apparatus that includes one or more cascaded identical NN modules may be trained using training LDCT image and corresponding training NDCT image. The training LDCT image may correspond to a training radiation dose level. The training may result in a determined number of NN modules, T. The trained MAP-NN apparatus may then be applied to a test LDCT image where the test LDCT image corresponds to a test radiation dose level that may differ from the training LDCT dose level. A respective intermediate image output data for each NN module may then be provided to a domain expert. The domain expert may then select a relatively best intermediate output image. A mapping depth of the NN modules in the cascade that corresponds to the relatively best intermediate output image may be less than or equal to the determined number, T, of NN modules. Incremental denoising may thus facilitate applying a trained MAP-NN apparatus to a test LDCT image when the training dose level and test dose level differ without retraining the MAP-NN apparatus, facilitated by a "radiologist in the loop".

Figure 3:
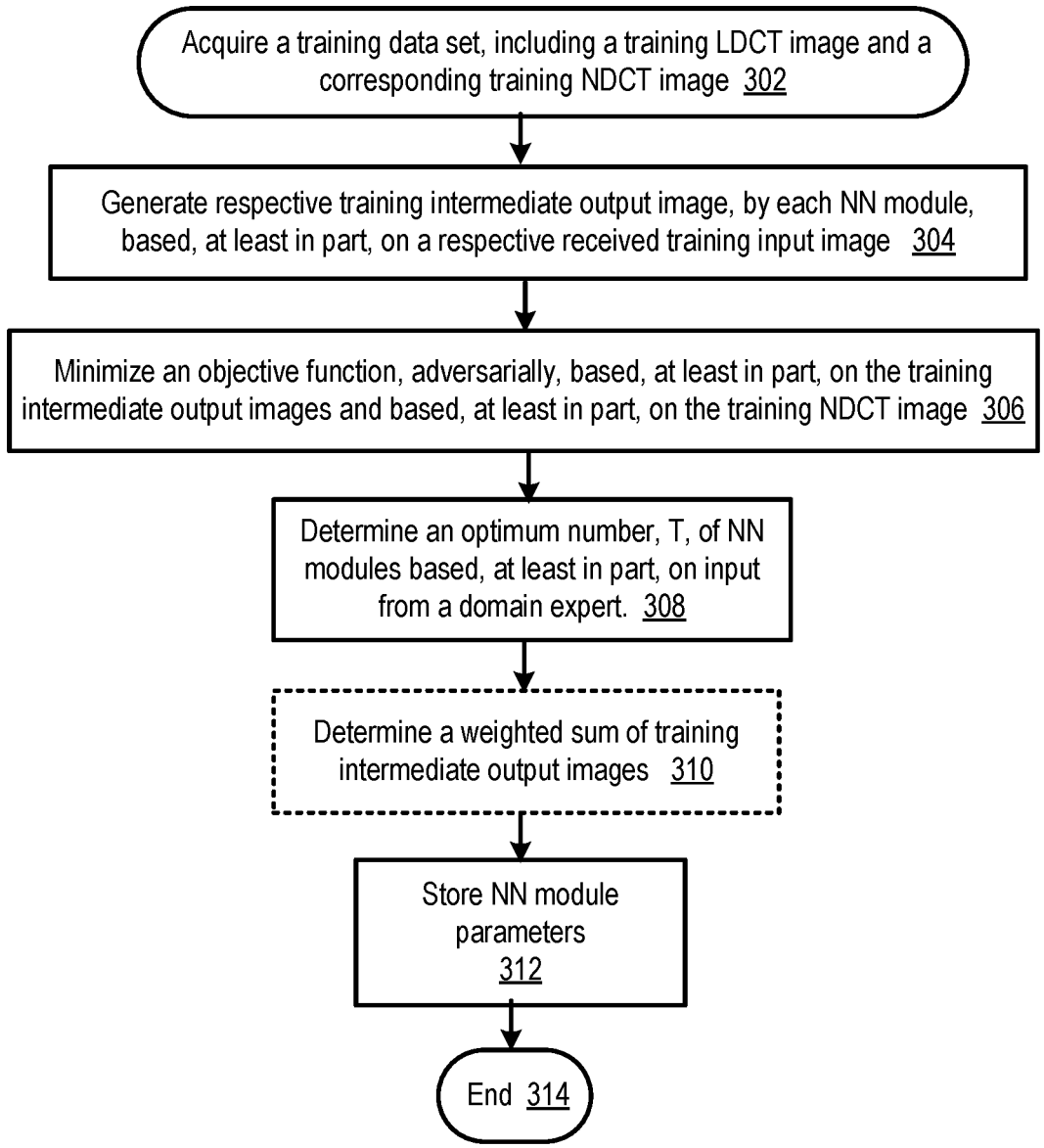
FIG. 3 is a flow chart of training operations for a MAP-NN for low-dose CT system according to various embodiments of the present disclosure.

FIG. 3 is a flow chart 300 of MAP-NN for low-dose CT system training operations according to various embodiments of the present disclosure. In particular, the flowchart 300 illustrates training a MAP-NN system for enhancing a low-dose (LD) computed tomography (CT) image. The operations may be performed, for example, by MAP-NN system 102 (e.g., MAP module 120, discriminator network 128, and/or MAP-NN apparatus 126 including one or more NN modules) of FIG. 1.

Operations of this embodiment may begin with acquiring a training data set at operation 302. The training data set may include a training LDCT image and a corresponding training NDCT image. The training LDCT image may correspond to a training radiation dose level. Each NN module is configured to generate a respective training intermediate output image based, at least in part, on a respective received training input image at operation 304. An objective function may be minimized adversarially at operation 306. The objective function may be minimized based, at least in part, on the training intermediate output images and based, at least in part, on the training NDCT image. For example, minimizing the objective function may include adjusting NN module parameters. An optimum number, T, of NN modules may be determined at operation 308. The optimum number, T, may be determined based, at least in part, on input from a domain expert (e.g., a radiologist). In some embodiments, a weighted sum of training intermediate output images may be determined at operation 310. The NN module parameters may be stored at operation 312. Program flow may then end at operation 314.

Thus, a MAP-NN system for enhancing a low-dose (LD) computed tomography (CT) image may be trained.

Figure 4:
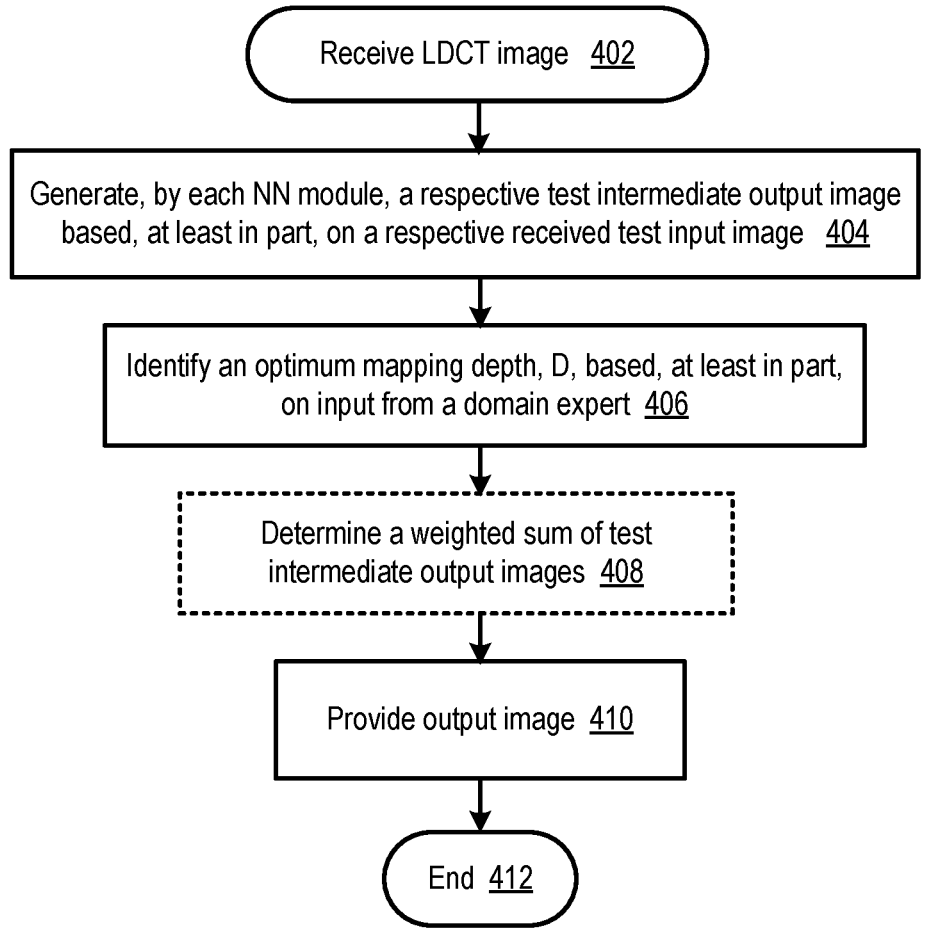
FIG. 4 is a flow chart of MAP-NN denoising operations for low-dose CT according to various embodiments of the present disclosure.

FIG. 4 is a flow chart of MAP-NN denoising operations for low-dose CT according to various embodiments of the present disclosure. In particular, the flowchart 400 illustrates enhancing a low-dose (LD) computed tomography (CT) image by a MAP-NN system. The operations may be performed, for example, by MAP-NN system 102 (e.g., MAP module 120 and/or MAP-NN apparatus 126 including one or more NN modules) of FIG. 1.

Operations of this embodiment may begin with receiving a LDCT image at operation 402. The LDCT image may be a test LDCT image. The test LDCT image may correspond to a test radiation dose level. In other words, the test LDCT image may be acquired at the test radiation dose level. Each NN module is configured to generate respective test intermediate output image based, at least in part, on a respective received test input image at operation 404. For example, generating respective test intermediate output image may be based, at least in part, on NN module parameters set during training, as described herein. An optimum mapping depth, D, may be identified at operation 406. The optimum mapping depth, D, may be determined based, at least in part, on input from a domain expert (e.g., a radiologist). In some embodiments, a weighted sum of test intermediate output images may be determined at operation 408. An output image may be provided at operation 410. In one example, the output image may correspond to the intermediate image output from the NN module at the optimum mapping depth.

In another example, the output image may correspond to the weighted sum determined at operation 408. Program flow may then end at operation 412.

Thus, a LDCT image may be enhanced through incremental denoising and domain expert in the loop, as described herein.

Example

In this example, each of the NN modules included in the MAP-NN apparatus corresponded to module 250 of FIG. 2B. Performance of the MAP-NN system was evaluated by radiologists based on the output of a last NN module in the sequence. The MAP-NN apparatus was configured with a variable number of NN modules. The number of NN modules ranged from three to seven. Performance of the MAP-NN with five (i.e., T=5) modules was deemed optimal by the radiologists, thus the number (T) of NN modules was selected to be five for the training set. The radiologists also evaluated the sequence of denoised images produced by each NN module in the series. It was found that a difference between two consecutive images increased significantly as T reduces from five and a gain was insignificant for T=6 or more.

It should be noted that the LDCT images in the training set were realistically simulated by the Mayo Clinic for the AAPM LDCT contest to be particularly noisy, which allowed the MAP-NN to be evaluated rigorously. In contrast, the testing set, which included images from actual clinical scanners, was less noisy. The radiologists conducted the analysis and concluded that the output of the third NN module was satisfactory, while the outputs of the fourth and fifth NN modules lost some structural fidelity. Thus, the mapping depth (D) in this example is three. The respective intermediate denoised images from each of the first three NN modules were used for later study.

Thus, it may be appreciated that a MAP-NN system, consistent with the present disclosure, that is trained on simulated LD and ND CT images may accurately process actual LDCT images to yield acceptable output images. In other words, a MAP-NN system, consistent with the present disclosure, may be adequately trained without actual LD and ND CT image pairs.

As used in any embodiment herein, the terms "logic" and/or "module" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may include, for example, singly or in any combination, hard-wired circuitry, programmable circuitry such as computer processors comprising one or more individual instruction processing cores, state machine circuitry, and/or firmware that stores instructions executed by programmable circuitry. The logic and/or module may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

The foregoing provides example system architectures and methodologies, however, modifications to the present disclosure are possible. The processor 110 may include one or more processing units and may be configured to perform operations of one or more circuitries, modules and/or artificial neural networks. Processing units may include, but are not limited to, general-purpose processing units, graphical processing units, parallel processing units, etc.

Memory 112 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system for enhancing a low-dose (LD) computed tomography (CT) image, the system comprising:
 a modularized adaptive processing neural network (MAP-NN) apparatus configured to receive a LDCT image as input, the MAP-NN apparatus comprising a number, T, trained neural network (NN) modules coupled in series, each trained NN module configured to generate a respective test intermediate output image based, at least in part, on a respective received test input image, each test intermediate output image corresponding to an incrementally denoised respective received test input image; and
 a MAP module configured to identify an optimum mapping depth, D, based, at least in part, on a selected test intermediate output image, the selected test intermediate output image selected by a domain expert, the mapping depth, D, less than or equal to the number, T,
 wherein the trained NN modules are trained based, at least in part, on a training input image, the training input image corresponding to a training radiation dose level.

2. The system of claim 1, wherein the training radiation dose level is different from a testing radiation dose level.

3. The system of claim 1, wherein each NN module is the same as each other NN module.

4. The system of claim 1, wherein each NN module is selected from the group comprising a fully connected convolutional network, a conveying-link oriented network encoder-decoder ("CLONE"), a convolutional encoder-decoder network with skip connections, a convolutional encoder-decoder with conveying-paths, a conveying-path-based convolutional encoder-decoder ("CPCE"), a stacked denoising autoencoder, and a corresponding three dimensional (3D) variant of each network.

5. The system of claim 1, wherein the MAP module is further configured to determine a weighted sum of the T respective test intermediate images.

6. The system of claim 1, wherein the trained NN modules are trained adversarially based, at least in part, on an objective function.

7. The system of claim 6, wherein the objective function is a composite function comprising a plurality of component functions.

8. A method for enhancing a low-dose (LD) computed tomography (CT) image, the method comprising:
receiving, by a modularized adaptive processing neural network (MAP-NN) apparatus, a LDCT image as input, the MAP-NN apparatus comprising a number, T, trained neural network (NN) modules coupled in series;
generating, by each trained NN module, a respective test intermediate output image based, at least in part, on a respective received test input image, each test intermediate output image corresponding to an incrementally denoised respective received test input image; and
identifying, by a MAP module, an optimum mapping depth, D, based, at least in part, on a selected test intermediate output image, the selected test intermediate output image selected by a domain expert, the mapping depth, D, less than or equal to the number, T, wherein the trained NN modules are trained based, at least in part, on a training input image, the training input image corresponding to a training radiation dose level.

9. The method of claim 8, wherein the training radiation dose level is different from a testing radiation dose level.

10. The method of claim 8, wherein each NN module is the same as each other NN module.

11. The method of claim 8, wherein each NN module is selected from the group comprising a fully connected convolutional network, a conveying-link oriented network encoder-decoder ("CLONE"), a convolutional encoder-decoder network with skip connections, a convolutional encoder-decoder with conveying-paths, a conveying-path-based convolutional encoder-decoder ("CPCE"), a stacked denoising autoencoder, and a corresponding three dimensional (3D) variant of each network.

12. The method of claim 8, further comprising determining, by the MAP module, a weighted sum of the T respective test intermediate images.

13. The method of claim 8, wherein the trained NN modules are trained adversarially based, at least in part, on an objective function.

14. The method of claim 13, wherein the objective function is a composite function comprising a plurality of component functions.

15. A computer readable storage device having stored thereon instructions configured for enhancing a low-dose (LD) computed tomography (CT) image, the instructions that when executed by one or more processors result in the following operations comprising:
receiving, by a modularized adaptive processing neural network (MAP-NN) apparatus, a LDCT image as input, the MAP-NN apparatus comprising a number, T, trained neural network (NN) modules coupled in series;
generating, by each trained NN module, a respective test intermediate output image based, at least in part, on a respective received test input image, each test intermediate output image corresponding to an incrementally denoised respective received test input image; and
identifying an optimum mapping depth, D, based, at least in part, on a selected test intermediate output image, the selected test intermediate output image selected by a domain expert, the mapping depth, D, less than or equal to the number, T, wherein the trained NN modules are trained based, at least in part, on a training input image, the training input image corresponding to a training radiation dose level.

16. The device of claim 15, wherein the training radiation dose level is different from a testing radiation dose level.

17. The device of claim 15, wherein the instructions that when executed by one or more processors result in the following additional operations comprising: determining a weighted sum of the T respective test intermediate images.

* * * * *